(12) United States Patent
Farrish

(10) Patent No.: US 9,708,207 B2
(45) Date of Patent: *Jul. 18, 2017

(54) METHOD AND APPARATUS FOR UPFLOW ALGAE SCRUBBER, MACROALGAL PHOTOBIOREACTOR AND SEA WEED CULTIVATOR

(71) Applicant: Bryan Harold Farrish, Santa Monica, CA (US)

(72) Inventor: Bryan Harold Farrish, Santa Monica, CA (US)

(*) Notice: Subject to any disclaimer, the term of this patent is extended or adjusted under 35 U.S.C. 154(b) by 19 days.

This patent is subject to a terminal disclaimer.

(21) Appl. No.: 14/801,643

(22) Filed: Jul. 16, 2015

(65) Prior Publication Data

US 2015/0321932 A1    Nov. 12, 2015

Related U.S. Application Data

(63) Continuation of application No. 13/989,040, filed as application No. PCT/US2012/031714 on Mar. 30, 2012, now Pat. No. 9,115,008.

(Continued)

(51) Int. Cl.
    *C02F 3/32*    (2006.01)
    *A01K 63/04*    (2006.01)
(Continued)

(52) U.S. Cl.
    CPC .............. *C02F 3/322* (2013.01); *A01G 33/00* (2013.01); *A01K 63/045* (2013.01); *C02F 3/101* (2013.01);
(Continued)

(58) Field of Classification Search
    CPC .. C02F 3/322; C02F 3/101; C02F 3/20; C02F 2103/007; C02F 2103/42; A01G 33/00; A01K 63/045; Y02W 10/15
(Continued)

(56) References Cited

U.S. PATENT DOCUMENTS

| 4,253,271 A | 3/1981 | Raymond |
| 4,966,096 A * | 10/1990 | Adey ..................... A01K 63/04 |
| | | 119/226 |

(Continued)

FOREIGN PATENT DOCUMENTS

| RU | 2005115562 | 10/2005 |
| RU | 71901 | 3/2008 |

OTHER PUBLICATIONS

Machine-generated English translation of RU 71901, generated on Sep. 26, 2016.*

(Continued)

*Primary Examiner* — Fred Prince
(74) *Attorney, Agent, or Firm* — Blakely, Sokoloff, Taylor & Zafman LLP

(57) ABSTRACT

An apparatus for water filtration, that includes a macroalgal attachment means defining a first macroalgal attachment surface and a bubbling means including, a housing defining a gas inlet and a set of gas bubble ports, and a coupling means. The coupling means secures the macroalgal attachment means to the bubbling means and aligns the first macroalgal attachment surface with the set of gas bubble ports such that a first portion of the gas bubbles to be produced by the gas bubble ports are directed to travel along the first macroalgal attachment surface in contact with the first macroalgal attachment surface.

20 Claims, 8 Drawing Sheets

Related U.S. Application Data

(60) Provisional application No. 61/591,975, filed on Jan. 29, 2012, provisional application No. 61/569,211, filed on Jan. 14, 2012, provisional application No. 61/570,462, filed on Dec. 14, 2011, provisional application No. 61/569,195, filed on Dec. 9, 2011, provisional application No. 61/554,455, filed on Nov. 1, 2011, provisional application No. 61/490,820, filed on May 27, 2011, provisional application No. 61/485,560, filed on May 12, 2011.

(51) Int. Cl.
| | | |
|---|---|---|
| *C02F 3/20* | (2006.01) | |
| *A01G 33/00* | (2006.01) | |
| *C02F 3/10* | (2006.01) | |
| *C02F 103/00* | (2006.01) | |
| *C02F 103/42* | (2006.01) | |

(52) U.S. Cl.
CPC .......... *C02F 3/20* (2013.01); *C02F 2103/007* (2013.01); *C02F 2103/42* (2013.01); *Y02W 10/15* (2015.05)

(58) Field of Classification Search
USPC .............. 210/167.22, 602, 220, 221.1, 221.2
See application file for complete search history.

(56) References Cited

U.S. PATENT DOCUMENTS

| | | |
|---|---|---|
| 5,527,456 A | 6/1996 | Jensen |
| 5,591,341 A | 1/1997 | Jensen |
| 9,115,008 B2 * | 8/2015 | Farrish .................. A01G 33/00 |

OTHER PUBLICATIONS

PCT Search Report, International Application No. PCT/US 2012/031714 filed Mar. 30, 2012.

* cited by examiner

US 9,708,207 B2

METHOD AND APPARATUS FOR UPFLOW ALGAE SCRUBBER, MACROALGAL PHOTOBIOREACTOR AND SEA WEED CULTIVATOR

CROSS-REFERENCE TO RELATED APPLICATIONS

This application is a continuation of co-pending U.S. application Ser. No. 13/989,040, filed on May 22, 2013, which is the National Stage of International Application No. PCT/US2012/031714, filed Mar. 30, 2012, which claims the benefit under 35 U.S.C. §119(e) of U.S. Provisional Application No. 61/591,975, filed Jan. 29, 2012, U.S. Provisional Application No. 61/569,211, filed Jan. 14, 2012, U.S. Provisional Application No. 61/570,462, filed Dec. 14, 2011, U.S. Provisional Application No. 61/569,195, filed Dec. 9, 2011, U.S. Provisional Application No. 61/554,455, filed Nov. 1, 2011, U.S. Provisional Application No. 61/490,820, filed May 27, 2011, and U.S. Provisional Application No. 61/485,560, filed May 12, 2011.

FIELD

An embodiment of the invention generally relates to an upflow algae scrubber that filters water of nutrients and promotes controlled growth of algal biomass in an efficient manner. Other embodiments are also described.

BACKGROUND

Many industries such as aquaria, aquaculture, wastewater, and pools and spas rely on "clean" water for their proper operation. In these industries, "clean" is defined as water that is low in nutrients (e.g. Inorganic Nitrates, Inorganic Phosphates, Nitrites, Ammonia, Ammonium, and metals such as Copper). These nutrients cause problems in water such as excessive algae and bacteria growth, and in some cases, poisoning of livestock. In these instances, algae disperse in the water in an uncontrolled manner thereby making algae removal difficult. Thus, in these industries there is a desire to remove nutrients and associated algae from the water to maintain "clean" water.

Despite the desire to remove nutrients and algae from water for certain applications, many industries rely on the presence of nutrients in the water for success. For example, food and biofuel industries grow algal biomass to produce their final products. This algal biomass requires a constant supply of nutrients to grow. Thus, there is a need for an algae scrubber that both filters the water of nutrients to provide clean water and promotes controlled growth of algal biomass such that the algae can be easily and efficiently harvested or otherwise removed from the water.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
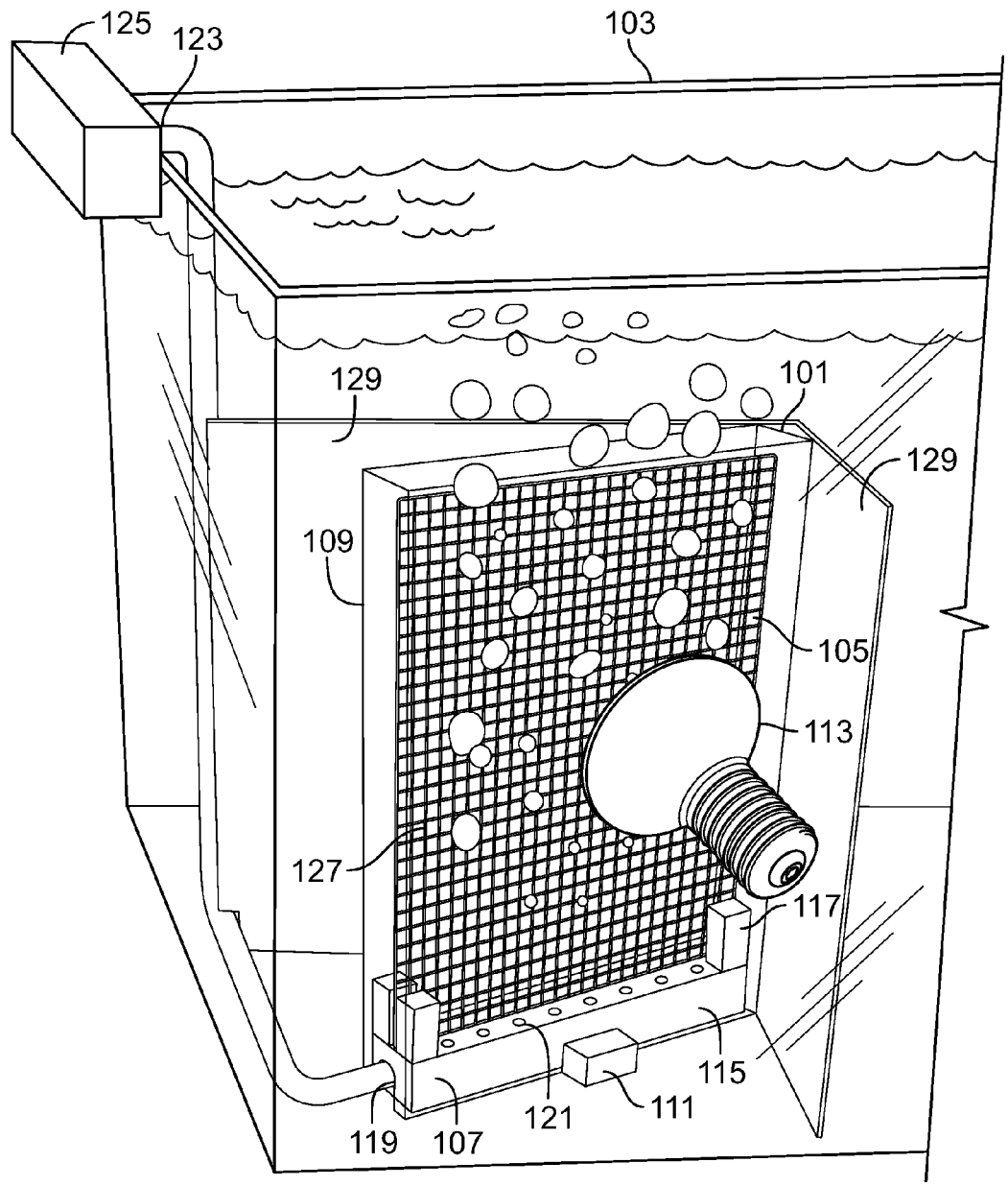
FIG. 1 shows one embodiment of an algae scrubber sitting at the bottom of a container of water for streaming water and gas bubbles upward onto a macroalgal attachment component.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

In the process of filtering water, the challenge has been how to grow algae easily so the algae can be removed or harvested, thus removing the nutrients from the water. If the algae are not removed, they will simply die and put the nutrients back into the water. For biomass growth and production, the challenge has been how to grow enough biomass, in a small space, cheaply.

Algae, either for filtering or for production, fall into two main algae categories: uni-cellular and multi-cellular. Uni-cellular algae are microscopic organisms which drift freely in the water (e.g. plankton) and give the water a usually green tint. Thus, uni-cellular algae are usually called "micro" algae or "phyto" plankton.

Multi-cellular algae are seaweeds that usually attach themselves to a surface. Since multi-cellular seaweeds are much larger than microalgae, they are usually called "macro" algae. It is these multi-cellular attached macroalgae seaweeds that are the focus of several of the embodiments of the algae scrubber described herein.

Algal filtering and production in the 1960's and 1970's used mainly attached macroalgae, but in the 1980's and 1990's more was being explored about using planktonic microalgae. Microalgae have many advantages including higher growth rates, so in the 2000's virtually all algal production devices used this form of algae. For harvesting, devices that separate the planktonic microalgae from the water are becoming less costly. For circulation to ensure microalgae remains mixed in the water, air bubbles from a sparger are used. However, the bubbles need to be tiny and travel at a low velocity to reduce shear-stress and breakage to the algal cells.

In freshwater aquariums, filtering devices typically reduce the amount of air in the water and as aquariums become larger and more complex, more effort is being placed on keeping air bubbles out of the water. Bubble aerators are only used in very small freshwater aquariums.

In saltwater aquariums, bubble aerators are not used at all because the bubbles irritate coral and fish and the bubbles cause "salt spray" at the surface, which covers nearby objects with salt. Successful saltwater tanks with substantial growth of coral, fish and invertebrates use large numbers of non-algal filtration units. Reacting to these results, algal filtration units were discontinued for sale in the late 1990's and early 2000's.

Despite research that discourages growing solid attached macroalgae in the proximity of gas bubbles, allowing gas bubbles to flow rapidly in an "airlift" fashion along a rough surface (e.g. a screen), promotes the growth of solidly attached macroalgae that rapidly consume virtually all pertinent nutrients from the water. Additionally, growing macroalgae on a rough surface with the assistance of gas bubbles eliminates the need to "separate" planktonic algae from the water during harvesting as the algae to be harvested is firmly attached to the rough surface.

Moreover, rapid flow and large bubble size do not impinge on macroalgal growth. Namely, the larger and more rapid the gas bubble flow, the more the algal strands are moved about, thus allowing more water and light to penetrate within their strands. Additionally, bubbles in an aquarium can be eliminated with the assistance of bubble-remover attachments after they have traversed algal growth such that they do not interfere with other aspects of the aquarium.

As described in more detail below, an algae scrubber that uses an "airlift" process to move water over a macroalgal growth surface provides several advantages for aquaria, biofuel and/or food production, including:

1. Eliminating the need for a drain that can often become clogged;
2. Eliminate the need of a water pump, which may harm small organisms and can also become clogged;
3. Eliminate the need of a separator to harvest algae particles from the water;
4. Eliminate the need for a sump as water does not have to leave the aquarium;
5. The algae scrubber cannot dry out or get dry spots, even during complete power failures;
6. The algae scrubber will never smell worse that the water itself, since it is always under water;
7. The algae scrubber's air pump can be placed at a remote distance away without risk of coming into contact with water;
8. The algae scrubber can grow for an extended period of time compared to waterfall algae scrubbers that matt-down due to gravity;
9. The algae scrubber cannot grow out of the water into the air; and
10. The algae scrubber cannot splash water, since there is no waterfall emptying onto the surface, and also since there is no waterfall "spray bar" that sometimes sprays water sideways.

Further, using an "airlift" algae scrubber as an enclosed macroalgal photobioreactor, or as an open pond grow-fence seaweed cultivator, provides similar advantages to using the algae scrubber in aquaria. In particular, when used as a grow-fence, production growth and total production are increased compared to horizontal growth layouts, because horizontal designs generate growth on the surface that block light from reaching deeper down algal strands. Vertical airlift grow-fences keep the growth attached to the fence allowing light to penetrate deep into the water. This allows the fences to be stacked together to increase the biomass that can be grown per acre.

FIG. 1 shows one embodiment of an algae scrubber 101 sitting at the bottom of a container of water 103. Although the container 103 shown in FIG. 1 is an aquarium, container 103 can be any vessel capable for holding water. For example, container 103 may be a swimming pool, a spa, a lake, an ocean, a reservoir, etc.

The algae scrubber 101 includes a macroalgal attachment component 105, a bubbling component 107, a compartment 109, an attachment mechanism 111, and a light source 113. Each of these elements will be described by way of example below.

The bubbling component 107 is a device for producing gas bubbles in a liquid. For example, the bubbling component 107 may be an airstone or aquarium bubbler. In one embodiment, the bubbling component 107 includes a housing 115 and a coupling mechanism 117. The housing 115 defines a gas inlet 119 for receiving a flow of gas and a set of gas bubble ports 121 for releasing the gas into the container 103. The gas inlet 119 may receive gas through a pipe or tube 123 coupled to the gas inlet 119. In one embodiment, a tube couples an external pump or compressor 125 to the gas inlet 119. Gas produced by the external pump 125 travels through the tube 123 into the gas inlet 119. Upon entering the gas inlet 119, the gas is exposed to the gas bubble ports 121 and is allowed to escape into the container 103 through the gas bubble ports 121 to form gas bubbles in the water of the container 103. In one embodiment, the gas bubble ports 121 are holes through the housing 115 that expose the gas inlet 119 to the container 103. The gas bubble ports 121 may be uniformly spaced along multiple rows on the housing 115 or randomly placed on the housing 115. In one embodiment, the gas bubble ports for use in aquaria are spaced 10 mm apart, but can be spaced between 5 mm and 20 mm apart while for seaweed cultivators the gas bubble ports may be spaced between 50 mm and 200 mm apart. In one embodiment, in an aquarium the bubbling component 107 emits 0.01-1.0 liters/minute per lineal inch of the bubbling component 107. For seaweed cultivation and other uses, the rate of gas flow through the bubbling component would be higher.

Macroalgal attachment component 105 is a screen or rigid mesh with at least one surface 127 for growing algae. In one embodiment, the macroalgal attachment component 105 is a rectangular plastic screen that provides a rough structure for growing algae. Although described as being formed of plastic, the macroalgal attachment component 105 may be composed of any non-corrosive material. As described herein, the surface 127 may be one side of the macroalgal attachment component 105 or a section of one side of the macroalgal attachment component 105. The macroalgal attachment component 105 and corresponding surface 127 should be as thin as possible and transparent to maximize the amount of light that reaches the roots of algal growth. In some embodiments, the macroalgal attachment component 105 is between 5-50 cm wide, 5-100 cm tall, and 1-10 mm thick. For example, in one embodiment, the macroalgal attachment component 105 is 25 cm wide, 50 cm tall, and 5 mm thick.

The coupling mechanism 117 couples the macroalgal attachment component 105 to the bubbling component 107. Although shown as separate from the bubbling component 107, in one embodiment the macroalgal attachment component 105 and the bubbling component 107 are a single indivisible unit. In this embodiment, the bubbling component 107 does not include the coupling mechanism 117.

The coupling mechanism 117 may be one or more clamps, screws, bolts, latches, weights, or similar devices that are capable of releasably coupling the macroalgal attachment component 105 to the bubbling component 107. Releasably coupling is defined as a connection that is configured to be released by a user without the assistance of external tools and without damage to the components, including the coupling mechanism 117, the bubbling component 107, the macroalgal attachment component 105, or other components of the algae scrubber 101. In one embodiment, the macroalgal attachment component 105 is decoupled from the bubbling component 107 such that algae growing on the macroalgal attachment component 105 can be harvested. As shown in FIG. 1, the coupling mechanism 117 is a set of weights that anchor the macroalgal attachment component 105 to the bubbling component 107. The coupling mechanism 117 aligns the surface 127 of the macroalgal attachment component 105 with one or more of the gas bubble ports 121. In one embodiment, an entire row of gas bubble ports 121 are aligned with the entire length of the surface 127. By aligning the gas bubble ports 121 with the surface 127 of the macroalgal attachment component 105, bubbles emitted by the gas bubble ports 121 are directed to travel along the surface 127 and come into direct contact with the surface 127.

By allowing gas bubbles to flow rapidly in an "airlift" fashion along the rough surface 127, solidly attached macroalgal growth will be formed on the macroalgal attachment component 105. The larger and more rapid the bubble flow, the better the algal strands are moved about, thus allowing more water and light to penetrate within the strands. This algal growth will rapidly consume virtually all pertinent nutrients from the water. Further, since the algae are attached to the macroalgal attachment component 105, there will not be a need to separate any planktonic algae from the water when the algae are harvested. To further increase algal growth, the gas bubbles may include $CO_2$ to provide even more carbon for the algae to consume.

In one embodiment, the compartment 109 surrounds the bubbling component 107 and the macroalgal attachment component 105. The compartment 109 may be formed of a translucent material that allows the passage of light to reach the surface 127 and corresponding algal growth. For example, the compartment 109 may be made of a clear plastic or glass material. Both gas bubbles and water are allowed into the compartment 109 either through the inlet 119 or a separate opening in the compartment 109 that exposes the interior of the compartment 109 to the water in the container 103. In one embodiment, an opening at the bottom of the compartment 109 allows water to enter the compartment 109 while gas enters through the inlet 119. As algal growth on the surface 127 is formed, gas bubbles will naturally be forced away by the strands of algal growth protruding from the surface 127. The compartment 109 ensures that the gas bubbles remain close and come into direct contact with the surface 127 by providing a barrier or guide. The compartment 109 is open on one side to allow the gas bubbles to escape the compartment 109 after they have traversed the surface 127. The opening on one side of the compartment 109 also allows for easy removal of the macroalgal attachment component 105 for harvesting.

The compartment 109 is sized to fit around the macroalgal attachment component 105. In some embodiments, the compartment 109 is between 5-50 cm wide, 5-100 cm tall, and 10-150 mm thick. For example, in one embodiment, the compartment 109 is 30 cm wide, 60 cm tall, and 30 mm thick. In one embodiment, the compartment 109 is positioned 20 mm away from the surface 127. By positioning the compartment 109 20 mm away, algal growth on the surface 127 will not grow thicker than 20 mm. Thus, the growth will rarely if ever block light from reaching the roots of the algal growth, which will prevent the growth from dying and detaching from the surface 127. In other embodiments, the compartment 109 is positioned between 5-30 mm from the surface 127 to promote the growth of smaller or larger algae strands. In one embodiment, the algae scrubber 101 does not include a compartment 109 and the surface 127 of the macroalgal attachment component 105 is directly exposed to the water in the container 103.

In some embodiments, the algae scrubber 101 is used in containers 103 with livestock. In these embodiments, algae are allowed to overgrow and detach from the surface 127. For example, in embodiments of the algae scrubber 101 that do not include the compartment 109 or in which the compartment 109 is open on one or more ends, algae may escape and float in the container 103. The algae will eventually flow into the livestock area and will thus be available for eating by herbivores.

After a desired level of growth has been reached, the solid algae on the surface 127 is removed (harvested) such that the nutrients are removed from the system and the algal growth can be used by food, aquaculture and/or biofuel industries. This is accomplished by removing the macroalgal attachment component 105 from the compartment 109 and scraping the algae off the surface 127. The macroalgal attachment component 105 is then replaced back into the compartment 109 to allow further algae to grow. This cleaning/harvesting may be performed manually by a user or by using an automated harvesting device that operates at predetermined intervals or in response to a triggering event.

In some embodiments, the bubbling component 107 grows algae on the housing 115. In these embodiments, the bubbling component 107 and the macroalgal attachment component 105 are a single, unified unit.

In some embodiments, the gas produced by the external pump or compressor 125 and received by the gas inlet 119 is pulsed or repeatedly turned on and off. This provides a periodic surge of flow back into the container 103, which may benefit certain livestock and reduce aeration costs. By using air pumps instead of water pumps, the algae scrubber 101 is more easily pulsed since air pumps are easily turned on and off, whereas water pumps are not, because they often need to be primed before each restart.

The compartment 109 is coupled to the container 103 with the attachment mechanism 111. The attachment mechanism 111 may be one or more clamps, screws, bolts, latches, or similar devices that are capable of coupling the compartment 109 to the container 103. In FIG. 1, the attachment mechanism 111 couples the compartment 109 to the bottom of the container 103. In other embodiments, the attachment mechanism 111 couples the compartment 109 to a side wall or ceiling of the container 103. In some embodiments, the algae scrubber 101 does not include an attachment mechanism 111. In these embodiments, the algae scrubber 101 rests on the floor of the container 103, leans against the side of the container 103, or floats in the water of the container 103.

In one embodiment, algae scrubber 101 may include a light source 113. The light source 113 is directed at the surface 127 of the macroalgal attachment component 105. Although shown in FIG. 1 as an artificial light (i.e. an electric light bulb), the light source 113 may be supplied by natural or artificial means. Natural lighting would include redirected light from the sun via mirrors, metal conduits or fiber optics, whereas artificial lighting would include all manner of electric bulbs, light emitting diodes, or other light-emitting devices. Using either natural or artificial light, the light source 113 could be directly coupled to the algae scrubber 101 or part of a separate device. In some embodiments, reflectors 129 are provided to surround the macroalgal attachment component 105 to increase the illumination of the surface 127 and promote algal growth. The reflectors 129 are made or are coated with reflective materials and reflect or redirect light from the light source 113 toward the algae growing on the surface 127.

Figure 2:
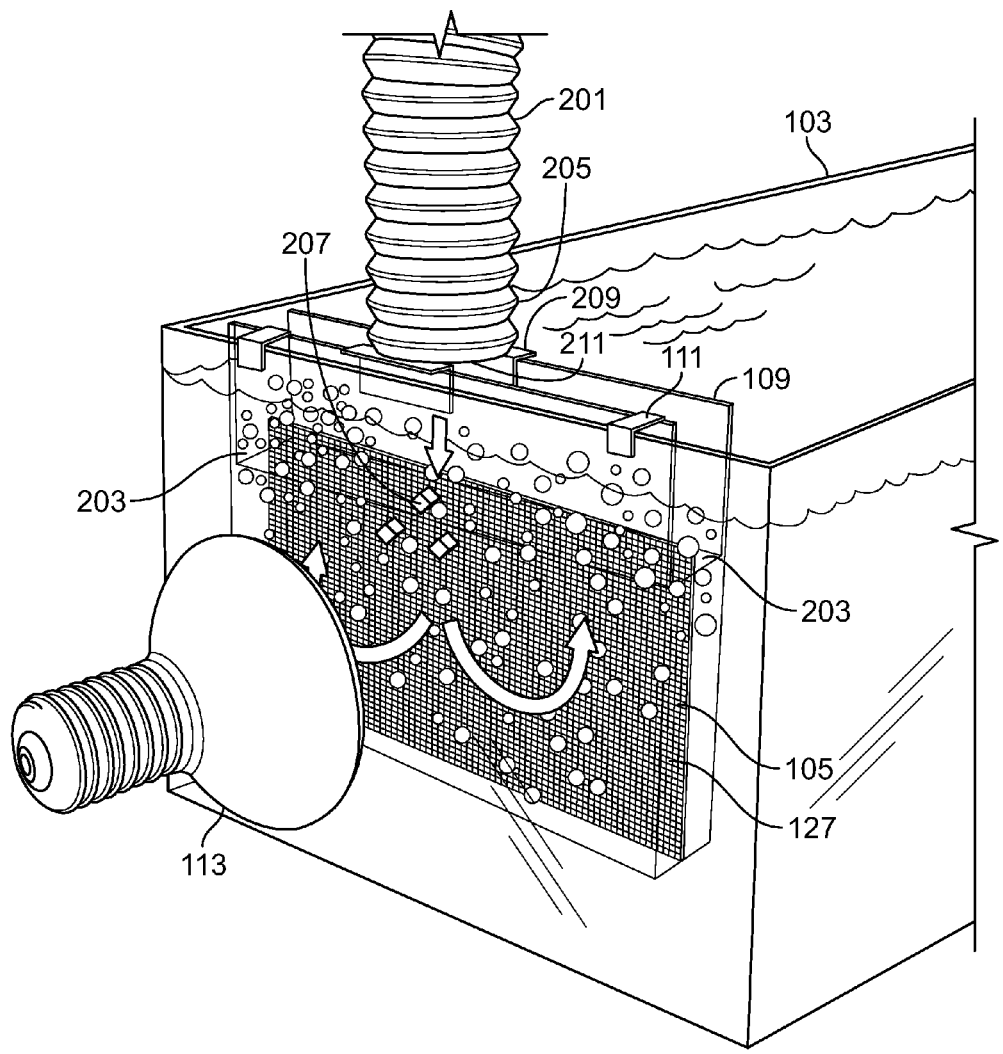
FIG. 2 shows an embodiment of the algae scrubber coupled to the side of the container for streaming water and gas bubbles downward onto the macroalgal attachment component.

FIG. 2 shows an embodiment of the algae scrubber 101 coupled to the side of the container 103 with attachment mechanisms 111. In this embodiment water and gas bubbles are streamed through a gas flow guide 201 downward onto the macroalgal attachment component 105. The gas flow guide 201 may be comprised of a housing 205 and a coupling mechanism 209. In one embodiment, the housing 205 is a hose that streams water and gas bubbles over the macroalgal attachment component 105 from a gas inlet 211. The housing 205 may be coupled to a dedicated water pump (e.g. a sump pump), water overflow from a filtration system, or a similar device for pumping water. The gas bubbles may be naturally occurring in the water as a result of the turbulence caused by the pumping and movement of the water or artificially introduced by pumping gas into the water stream. For example, $CO_2$ may be pumped into the water stream from an external source. In some embodiments, $CO_2$ is captured from industrial processes and pumped into the water.

The coupling mechanism 209 secures the macroalgal attachment component 105 to the gas flow guide 201. The coupling mechanism 209 may be one or more clamps, screws, bolts, latches, or similar devices that are capable of coupling the macroalgal attachment component 105 to the gas flow guide 201. As shown in FIG. 2, the coupling mechanism 209 is a brace that secures the gas flow guide 201 to a top portion of the compartment 109. The coupling mechanism 209 aligns the surface 127 of the macroalgal attachment component 105 with the gas flow guide 201. In one embodiment, the gas flow guide 201 does not include the coupling mechanism 209. In this embodiment, the gas flow guide 201 is not coupled to the compartment 109, but is aimed at the macroalgal attachment component 105.

In the embodiment of FIG. 2, water and gas bubbles pour from the housing 205 down the surface 127 and circulate back up the surface 127 by the force of a constant down pouring of water and gas bubbles. The compartment 109 includes overflow slots 203 on multiple sides to allow the water and gas bubbles to escape into the container 103 after they have circulated and contacted the surface 127. In some embodiments, the compartment 109 does not include overflow slots 203.

In one embodiment, one or more diffractors 207 are coupled to the surface 127. The diffractors 207 are small blocks that diffract the movement of water and gas bubbles over various sections of the surface 127. In this way, the gas bubbles are not primarily focused on one section of the surface 127 while neglecting other sections. Allowing gas bubbles to come into contact with various sections of the surface 127 provides a more uniform level of algal growth across the surface 127 and maximizes the growth of algae before harvesting must be performed. In some embodiments, the diffractors 207 are between 5-50 mm wide, 5-50 mm tall, and 5-50 mm thick. For example, in one embodiment, the diffractors 207 are 20 mm wide, 20 mm tall, and 20 mm thick.

Figure 3:
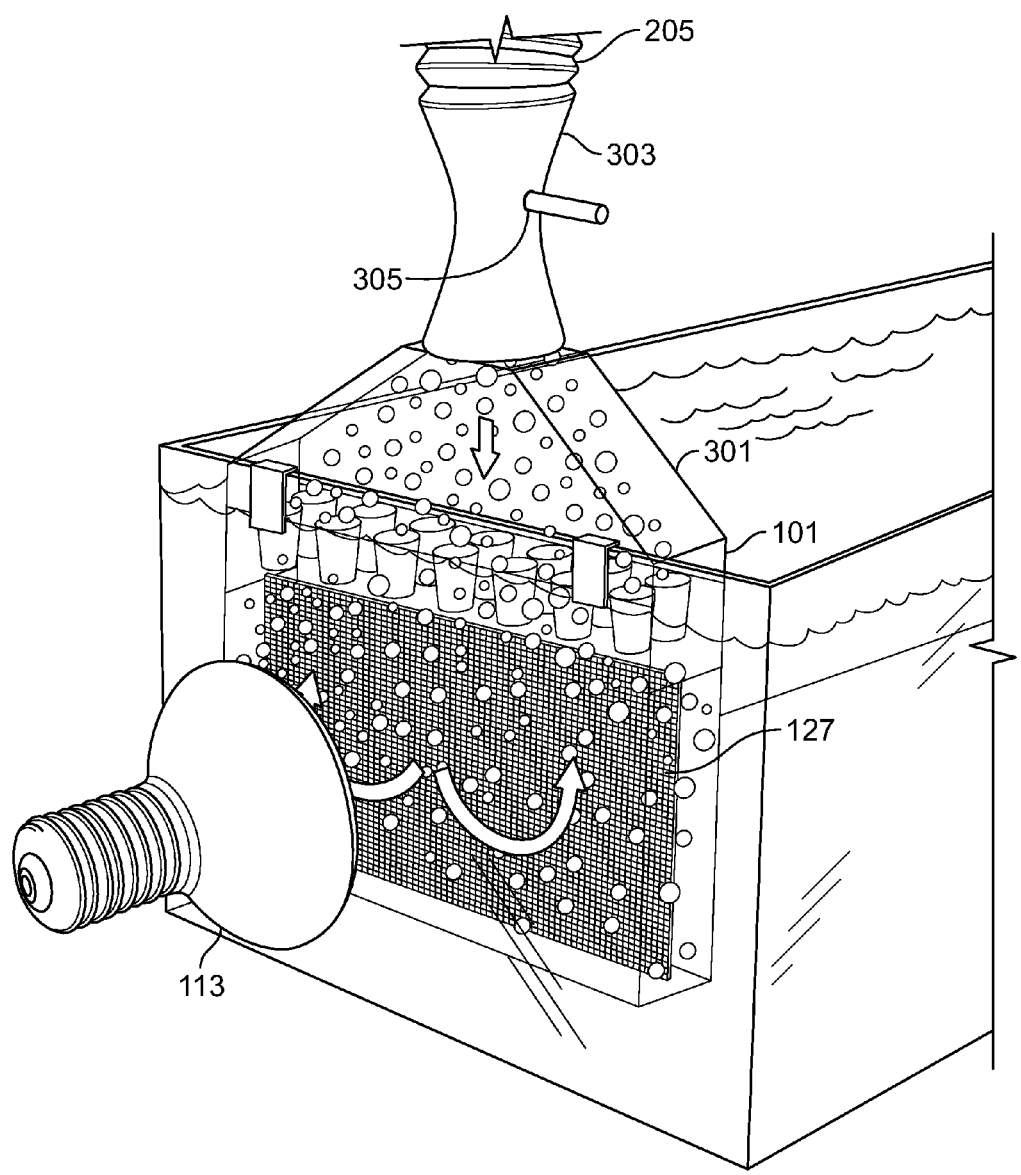
FIG. 3 shows an embodiment of the algae scrubber with a collector to guide gas bubbles from the housing onto the macroalgal attachment component.

FIG. 3 shows an embodiment of the algae scrubber 101 with a collector 301 to guide gas bubbles from the housing 205 onto the surface 127. The collector 301 receives a stream of water and gas bubbles from the housing 205 and distributes the water and gas bubbles over various sections of the surface 127. In one embodiment, the collector 301 may be defined by an enclosure that is tapered at a first end coupled to the housing 205 and expanded at a second end coupled to the surface 127. In one embodiment, the second end includes one or more funnels for directing the stream of water gas bubbles to separate sections of the surface 127.

In one embodiment, a venturi valve 303 is used to introduce gas bubbles to the water stream. The venturi valve 303 uses the Bernouli principle of air injection. A stream of highly pressurized water is injected through the housing 205 which is restricted at one end. As it exits the restriction, an opening 305 that is adjacent to the output of the restriction causes a pressure differential to occur. This has the effect of dragging air along with the stream of water producing many tiny gas bubbles. The venturi valve 303 may introduce gas bubbles to the water stream without supplemental addition of air from an externally powered source.

Figure 4:
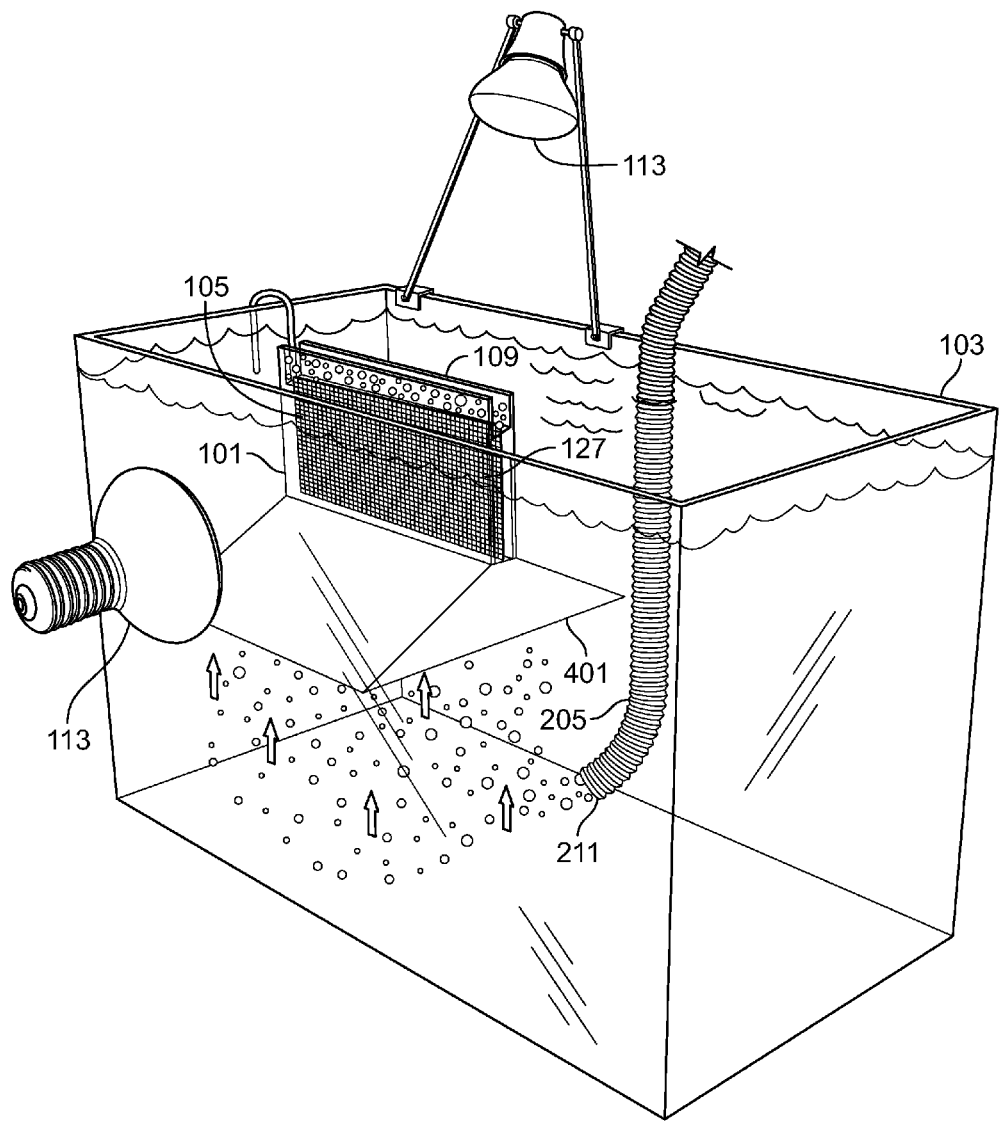
FIG. 4 shows an embodiment of the algae scrubber with an open collector for collecting gas bubbles as they rise in the container and directing the gas bubbles onto the macroalgal attachment component.

FIG. 4 shows an embodiment of the algae scrubber 101 with an open collector 401. The open collector 401 is defined by a wide opening on a first side for collecting gas bubbles in the container 103 and a narrower opening on a second side for directing the collected gas bubbles to the surface 127 of the macroalgal attachment component 105. In this embodiment, the bottom of the compartment 109 is open and is coupled to the narrow opening of the open collector 401. The housing 205 is inserted directly into the water of the container 103 through which a stream of water and/or gas bubbles are released into the container 103. The wide opening of the open collector 401 is directed downwards to collect gas bubbles as they rise in the container 109. The gas bubbles are directed by the open collector 401 through the narrower opening to the surface 127 of the macroalgal attachment component 105. The gas bubbles continue to rise as they come into contact with the surface 127 and are eventually released into the atmosphere upon reaching the top of the container 109.

As noted above, the open collector 401 is tapered. In some embodiments, the wide opening on the first side for collecting gas bubbles is between 10-50 cm wide and the narrower opening on the second side for directing the collected gas bubbles to the surface 127 is between 10-50 mm thick. For example, the wide opening may be 40 cm and the narrower opening is 30 mm and matches the thickness of the compartment 109.

In one embodiment, the algae scrubber 101 with the open collector 401 includes a light source 113. As shown in FIG. 4, the light source 113 is coupled to a top portion of the container 103 and directed downward at the surface 127. In other embodiments, the light source 113 may be a light emitting diode (LED) array clamped to both sides of the compartment 109 and directed at the surface 127.

Figure 5:
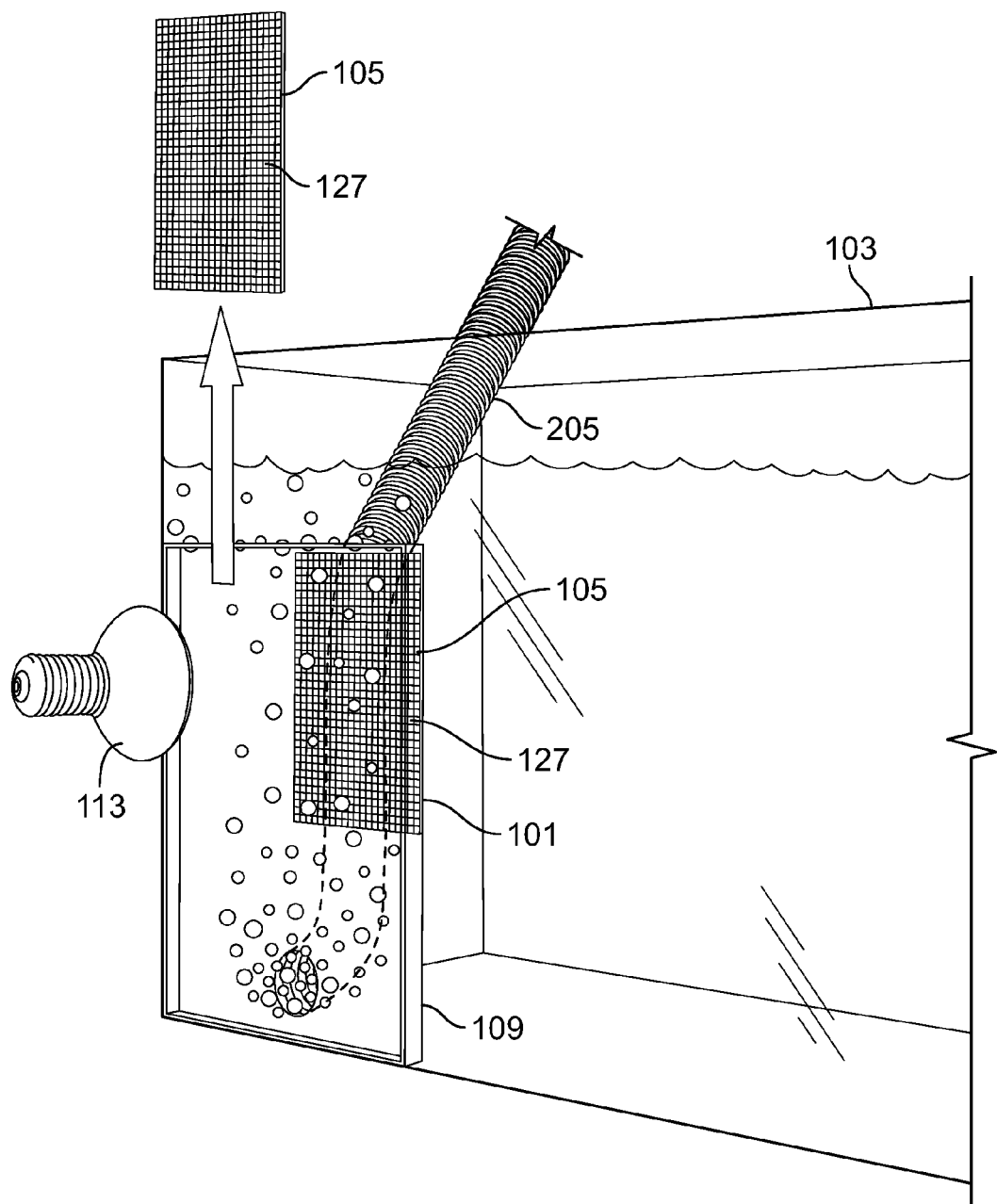
FIG. 5 shows an embodiment of the algae scrubber with multiple removable macroalgal attachment components.

FIG. 5 shows an embodiment of the algae scrubber 101 with multiple macroalgal attachment components 105. In the algae scrubber 101 with multiple macroalgal attachment components 105 of FIG. 5, the housing 205 is coupled to a bottom portion of the compartment 109. The housing 205 receives water and/or gas bubbles from an external source and pumps the water and gas bubbles into the compartment 109. As gas bubbles and water are forced into the compartment 109, the gas bubbles rise and come into direct contact with the surfaces 127 of the macroalgal attachment components 105. This direct contact of gas bubbles to the surfaces 127 promotes the growth of algae on the surfaces 127. In this embodiment, each of the macroalgal attachment components 105 may be individually removed through a top open portion of the compartment 109. After removal, algal growth on the surface 127 may be harvested and collected. Thereafter, the macroalgal attachment components 105 may be returned to the compartment 109 for further algae to be grown. By locating the algae scrubber 101 in the container 103 as opposed to in a waterfall style external device, algae growing in the algae scrubber 101 may be harvested without turning off the flow of gas bubbles. This eases the method of harvesting and limits overgrowth caused by inattention.

In one embodiment, the macroalgal attachment component 105 is automatically lifted out of the compartment 109 and out of the container 103 and automatically replaced with a fresh macroalgal attachment component 105. The removed macroalgal attachment component 105 is cleaned and algae are harvested while algae begin to grow on the newly inserted macroalgal attachment component 105. In some embodiments, the macroalgal attachment component 105 includes a brush parallel to the surface 127. During removal, the brush of the macroalgal attachment component 105 could be pushed or pressed up against a wall of the compartment 109 or container 103 to brush the wall clear of algal growth which may be blocking the light from the light source 113.

In one embodiment, the compartment 109 and/or the macroalgal attachment component 105 is capable of pivoting so that the surface 127 is perpendicular to the light source 113 at all times. The pivoting could be performed manually by a user or through an automated technique that tracks the movement of the light source 113. This automated pivoting is especially applicable when natural light sources (e.g. the Sun) that naturally move are used.

Figure 6A:
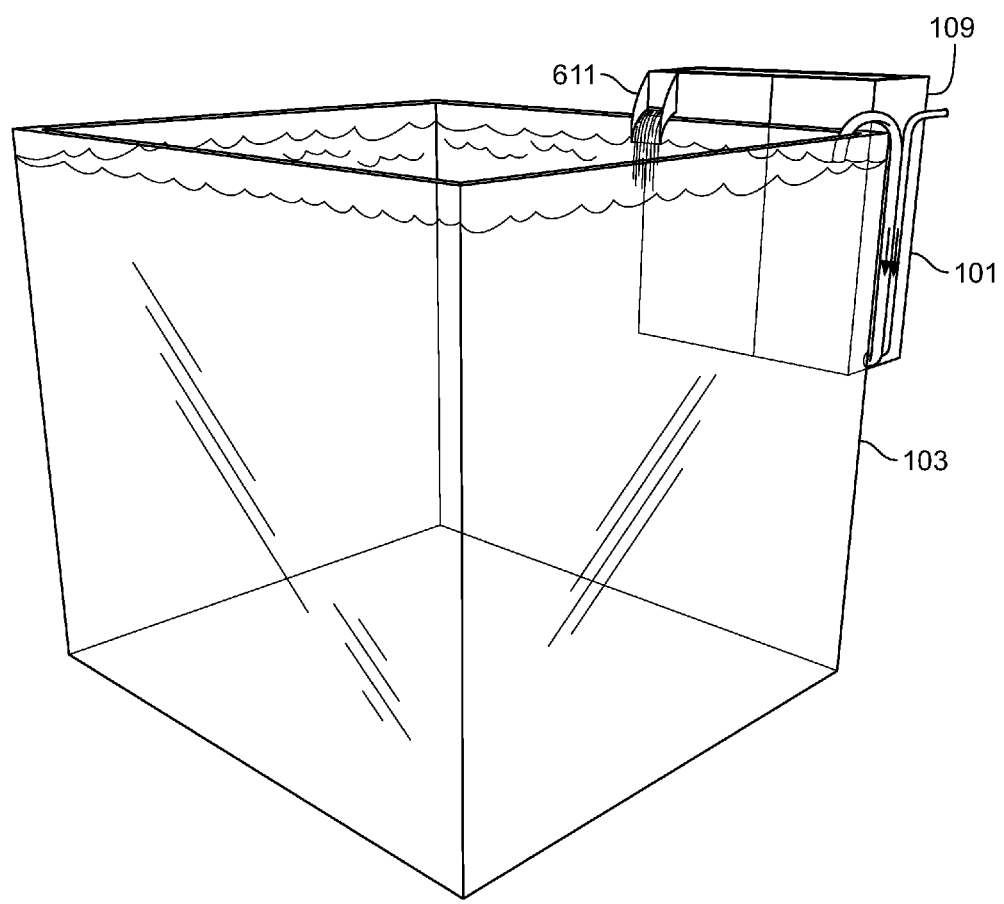
FIGS. 6A and 6B show embodiments of the algae scrubber hanging on the back of a container.

FIG. 6A shows an embodiment of the algae scrubber 101 in which the scrubber 101 hangs on the back of the container 103. As described below, although the algae scrubber 101 hangs on the back of the container 103 and is outside the water of the container 103, a macroalgal attachment component 105 located inside the compartment 109 of the algae scrubber 101 is still submerged in water from the container 103 and is exposed to corresponding nutrients in the water.

Figure 6B:
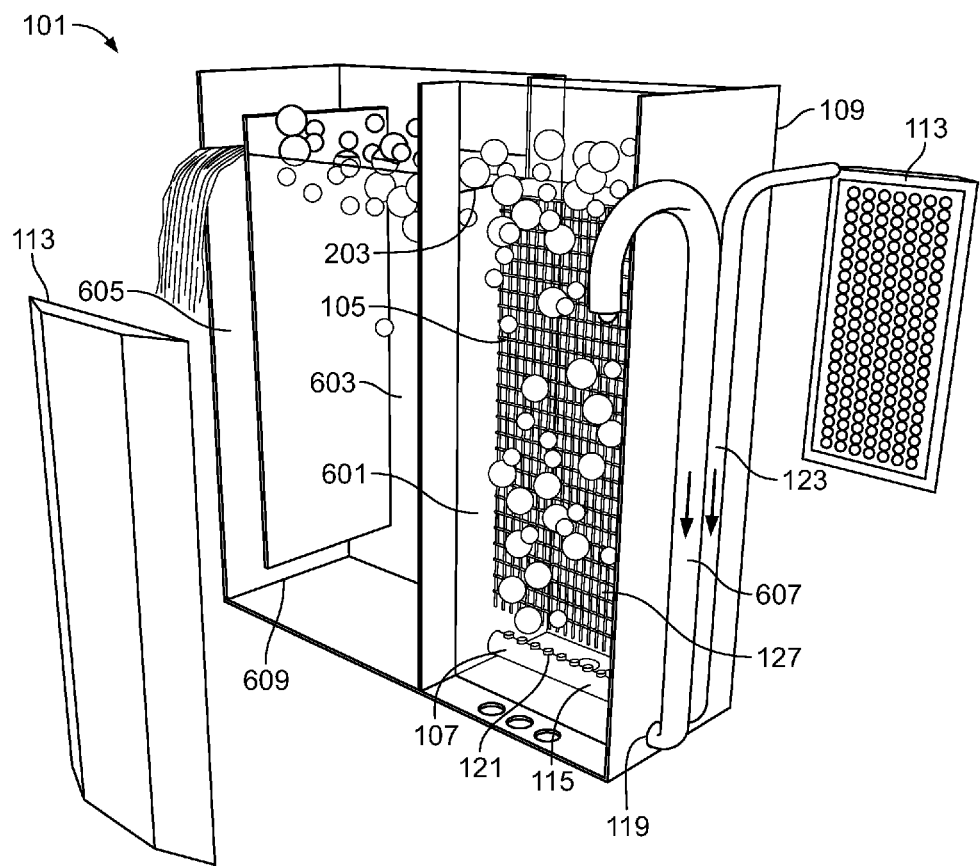

FIG. 6B shows a cutaway view of the hang on back algae scrubber 101. The algae scrubber 101 in this embodiment includes a divided compartment 109. The first division 601 includes the macroalgal attachment component 105 and the bubbling component 107. The bubbling component 107 is located in a bottom portion of the first division 601 and is faced upwards towards the macroalgal attachment component 105. The bubbling component 107 receives gas from a tube 123 that is connected to an external gas source such as a gas pump 125. Gas flowing to the bubbling component 107 is released as gas bubbles into the first division 601 through gas bubble ports 121 in the bubbling component 107. The surface 127 of the macroalgal attachment component 105 is aligned with the gas bubble ports 121 such that the gas bubbles come into contact and travel along the surface 127. In one embodiment, one or more light sources 113 surround the macroalgal attachment component 105. As shown, the light sources 113 are LED arrays. However, the lights sources 113 may be any combination of natural or artificial light emitting devices.

As gas is transported through the bubbling component 107, water is delivered into the first division 601 through a circulation housing 607. In one embodiment, the circulation housing 607 is a tube that siphons water from the container 103. The circulation housing 607 may push water through a lower end of the first division 601 such that water flows upward in the first division 601. As the water circulates upward through the first division 601, water and gas bubbles spill from an overflow slot 203 and into the second division 603. Gas bubbles are collected at the top of the second division 603 and explode thereby releasing the corresponding gas through holes in the compartment 109 into the atmosphere. Thereafter, the water may be transferred through a lower gateway 609 to a third division 605 and eventually back into the container 103 through a spout 611. Since the gas bubbles were allowed to dissipate/explode in the second division 603 before the water is allowed to return to the container 103, gas bubbles from the bubbling component 107 are not transferred to the water in the container 103.

Figure 7:
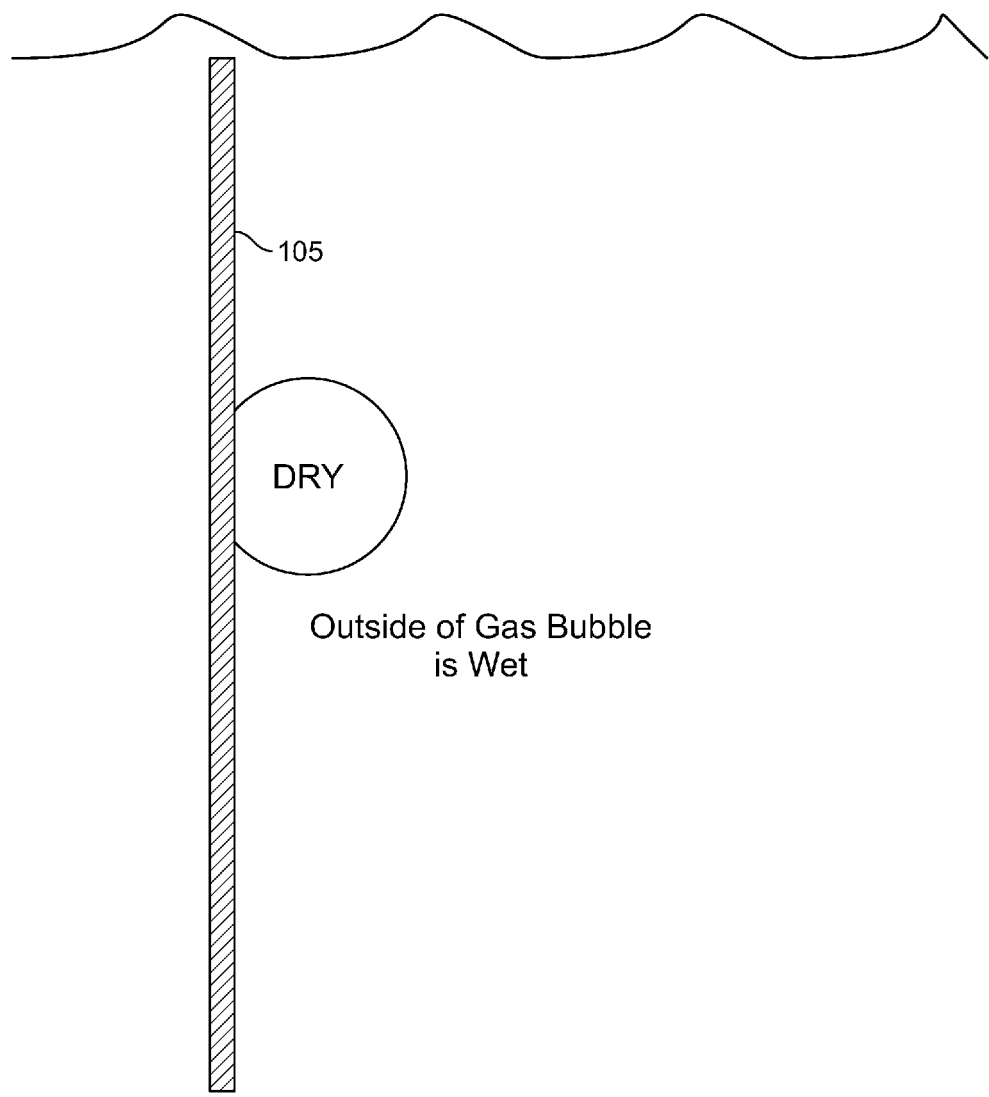
FIG. 7 shows the macroalgal attachment component submerged in water with a gas bubble rubbing up against the macroalgal attachment component.

As described above, the algae scrubber 101 forces gas bubbles to come into contact and rub against the macroalgal attachment component 105. This rubbing is necessary to promote algae growth on the macroalgal attachment component 105. As shown in FIG. 7, the macroalgal attachment component 105 is naturally wet, because it is submerged in water. In contrast, the insides of gas bubbles are dry. Since water does not absorb $CO_2$ quickly when the macroalgal attachment component 105 is wet, not enough $CO_2$ gets to the macroalgae growing on the macroalgal attachment component 105 if the component is always wet. However, when the macroalgal attachment component 105 alternates from wet to dry via bubbles rubbing up against the component 105, $CO_2$ is delivered directly to macroalgae tissue and much more algae growth takes place.

Although the embodiments of the algae scrubber 101 discussed herein can be used to grow any type of algae, the preferred types of algae are green hairy variations such as derbasia, enteromorpha (ulva), chaetomorpha, and cladophora. These types of algae are preferred, because they are somewhat transparent to light and water flow. These characteristics allow light and water to reach the roots of the algae that are attached to the surface 127. This penetration keeps roots alive, so that the algae strands do not detach and float away. In one embodiment, especially useful for biofuel production, the macroalgal attachment component 105 is inoculated with a desired species of macroalgae that produces the highest lipid content, gasification or ethanol production. The algae scrubber 101 would then be seeded with a preferred algal species and would ensure the preferred algal species is grown. Although the algae species noted above are preferred, the algae scrubber 101 can be used to grow any type of algae.

As noted above, the algae scrubber 101 may be used in a variety of different containers 103. In one embodiment, the macroalgal attachment component 105 is floated at the surface of a river, lake, ocean, agriculture runoff area, or wastewater containment facility so that the top of the macroalgal attachment component 105 is at the water surface and the bottom of the macroalgal attachment component 105 is deep in the water. The macroalgal attachment component 105 could be rotated into shore by a cable for manual or automatic cleaning/harvesting. In another embodiment, the algae scrubber 101 is used for hobby food/gardening/skin care/beer/wine making at home. In this embodiment, the algae scrubber 101 is fed nutrients from a reservoir to ensure the algae have sufficient resources to grow on the macroalgal attachment component 105.

In one embodiment, an apparatus 101 for water filtration, comprises a macroalgal attachment means 105 defining a first macroalgal attachment surface 127; and a bubbling means 107 including, a housing 115 defining a gas inlet 119 and a set of gas bubble ports 121, and a coupling means 117, the coupling means 117 to secure the macroalgal attachment means 105 to the bubbling means 107 and to align the first macroalgal attachment surface 127 with the set of gas bubble ports 121 such that a first portion of the gas bubbles to be produced by the gas bubble ports 121 are directed to travel along the first macroalgal attachment surface 127 in contact with the first macroalgal attachment surface 127.

In one embodiment, the macroalgal attachment means further defines a second macroalgal attachment surface 127, such that a second portion of the gas bubbles to be produced by the set of gas bubble ports 121 are directed to travel along the second macroalgal attachment surface 127 in contact with the second macroalgal attachment surface 127.

In one embodiment, the first macroalgal attachment surface 127 is defined by a screen.

In one embodiment, the apparatus 101 further comprises: a compartment 109 within which the macroalgal attachment means 105 and the bubbling means 107 are disposed; and an attachment mechanism 111 to couple the compartment 109 to a container 103 for liquid.

In one embodiment, the apparatus 101 further comprises: a light source 113 coupled to the compartment 109, the light source 113 to illuminate the first macroalgal attachment surface 127 to facilitate macroalgal growth.

In one embodiment, the container 103 is an aquarium.

In one embodiment, the container 103 is a swimming pool.

In one embodiment, the container 103 is a natural water reservoir.

In one embodiment, the macroalgal attachment means (105) is releasably coupled to the bubbling means (107) to allow the macroalgal attachment means (105) to be removed from the compartment (109) and enable algae to be harvested.

In one embodiment, an apparatus 101 for water filtration, comprises: a macroalgal attachment means 105 defining a first macroalgal attachment surface 127; and a gas flow guide means 201 including, a housing 205 defining a gas inlet 211, and a coupling means 209, the coupling means 209 to secure the macroalgal attachment means 105 to the gas flow guide means 201 and to align the macroalgal attachment surface 127 with a flow of gas bubbles from the gas inlet 211 such that a first portion of the gas bubbles to be received by the gas inlet 211 are directed to travel along the first macroalgal attachment surface 127 in contact with the first macroalgal attachment surface 127.

In one embodiment, the gas flow guide means 201 further includes a set of diffractors 207 that disperse the first portion of gas bubbles along the first macroalgal attachment surface 127.

In one embodiment, the gas flow guide means 201 further includes a venturi valve 303 for producing the gas bubbles.

In one embodiment, the apparatus 101 further comprises: a compartment 109 within which the macroalgal attachment means 105 and the gas flow guide means 201 are disposed; and an attachment mechanism 111 to couple the compartment 109 to a container 103 for liquid.

In one embodiment, the apparatus 101 further comprises: a light source 113 coupled to the housing 205, the light source 113 to illuminate the first macroalgal attachment surface 127 to facilitate macroalgal growth.

In one embodiment, the apparatus 101 further comprises: a collector 301, 401 to guide gas flow from the gas inlet 211 onto the first macroalgal attachment surface 127.

In one embodiment, the collector 301 defines a set of nozzles to shape the gas flow within the gas flow guide 201.

In one embodiment, the container 103 is an aquarium.

In one embodiment, the container 103 is a swimming pool.

In one embodiment, the container 103 is a natural water reservoir.

In one embodiment, the macroalgal attachment means (105) is releasably coupled to the gas flow guide means (201) to allow the macroalgal attachment means (105) to be removed from the compartment (109) and enable algae to be harvested.

In one embodiment, an apparatus (101) for water filtration, comprises: a macroalgal attachment means (105) defining a first macroalgal attachment surface (127); a compartment (109) that defines a gas flow passage (601) within which the macroalgal attachment means (105) is disposed; and a bubbling means (107) including, a housing (115) defining a gas inlet (119) and a set of gas bubble ports (121), the macroalgal attachment surface (127) is aligned with the set of gas bubble ports (121) such that a first portion of gas bubbles to be produced by the gas bubble ports (121) are directed to travel along the first macroalgal attachment surface (127) in contact with the first macroalgal attachment surface (127).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An apparatus for water filtration, comprising:
a macroalgal attachment component having a macroalgal attachment surface; and
an alignment mechanism coupled to the macroalgal attachment component, the alignment mechanism comprising a coupling mechanism configured to push upward on the macroalgal attachment component and to align the macroalgal attachment surface with one or more gas bubble ports producing a flow of gas bubbles such that a portion of the gas bubbles travels upward along the macroalgal attachment surface.

2. The apparatus of claim 1, wherein the coupling mechanism includes a clamp.

3. The apparatus of claim 1, wherein the one or more gas bubble ports is a set of gas bubble ports, and wherein the gas bubbles rub against macroalgae attached to the macroalgal attachment surface to promote algal growth.

4. The apparatus of claim 1 further comprising a compartment having compartment walls surrounding the macroalgal attachment component, wherein the compartment guides the gas bubbles upward along the macroalgal attachment surface.

5. The apparatus of claim 4, wherein the compartment walls are within 40 mm of the macroalgal attachment surface.

6. The apparatus of claim 4, wherein the compartment walls are within 20 mm of the macroalgal attachment surface.

7. The apparatus of claim 1, wherein the macroalgal attachment component includes a circuitous structure, and wherein the circuitous structure includes one or more rough inside surfaces to promote algal growth.

8. An apparatus for water filtration, comprising:
a macroalgal attachment component having a macroalgal attachment surface; and
an alignment mechanism coupled to the macroalgal attachment component, the alignment mechanism comprising a coupling mechanism configured to pull downward on the macroalgal attachment component and to align the macroalgal attachment surface with one or more gas bubble ports producing a flow of gas bubbles such that a portion of the gas bubbles travels upward along the macroalgal attachment surface.

9. The apparatus of claim 8, wherein the coupling mechanism includes a weight.

10. The apparatus of claim 8, wherein the one or more gas bubble ports is a set of gas bubble ports, and wherein the gas bubbles rub against macroalgae attached to the macroalgal attachment surface to promote algal growth.

11. The apparatus of claim 8 further comprising a compartment having compartment walls surrounding the macroalgal attachment component, wherein the compartment guides the gas bubbles upward along the macroalgal attachment surface.

12. The apparatus of claim 11, wherein the compartment walls are within 40 mm of the macroalgal attachment surface.

13. The apparatus of claim 11, wherein the compartment walls are within 20 mm of the macroalgal attachment surface.

14. The apparatus of claim 10, wherein the macroalgal attachment component includes a circuitous structure, and wherein the circuitous structure includes one or more rough inside surfaces to enable seaweed to attach and grow.

15. An apparatus for water filtration, comprising:
a macroalgal attachment component having a macroalgal attachment surface; and
an alignment mechanism coupled to the macroalgal attachment component, the alignment mechanism comprising a coupling mechanism configured to pull upward on the macroalgal attachment component and to align the macroalgal attachment surface with one or more gas bubble ports producing a flow of gas bubbles such that a portion of the gas bubbles travels upward along the macroalgal attachment surface.

16. The apparatus of claim 15, wherein the coupling mechanism includes a float.

17. The apparatus of claim 15, wherein the one or more gas bubble ports is a set of gas bubble ports, and wherein the gas bubbles rub against macroalgae attached to the macroalgal attachment surface to promote algal growth.

18. The apparatus of claim 15 further comprising a compartment having compartment walls surrounding the macroalgal attachment component, wherein the compartment guides the gas bubbles upward along the macroalgal attachment surface.

19. The apparatus of claim 18, wherein the compartment walls are within 40 mm of the macroalgal attachment surface.

20. The apparatus of claim 15, wherein the macroalgal attachment component includes a circuitous structure, and wherein the circuitous structure includes one or more rough inside surfaces to enable seaweed to attach and grow.

* * * * *